(12) United States Patent
Sahhary et al.

(10) Patent No.: US 11,262,221 B2
(45) Date of Patent: Mar. 1, 2022

(54) METHOD AND APPARATUS FOR DETERMINING A MEASURING OFFSET OF A ROTOR POSITION SENSOR

(71) Applicant: VALEO SIEMENS EAUTOMOTIVE GERMANY GMBH, Erlangen (DE)

(72) Inventors: Bassel Sahhary, Erlangen (DE); Andreas Walter, Nuremberg (DE)

(73) Assignee: VALEO SIEMENS EAUTOMOTIVE GERMANY GMBH, Erlangen (DE)

(*) Notice: Subject to any disclaimer, the term of this patent is extended or adjusted under 35 U.S.C. 154(b) by 139 days.

(21) Appl. No.: 16/757,050

(22) PCT Filed: Dec. 19, 2018

(86) PCT No.: PCT/EP2018/085846
§ 371 (c)(1),
(2) Date: Apr. 17, 2020

(87) PCT Pub. No.: WO2019/121918
PCT Pub. Date: Jun. 27, 2019

(65) Prior Publication Data
US 2020/0249054 A1    Aug. 6, 2020

(30) Foreign Application Priority Data

Dec. 21, 2017 (EP) ...................................... 17209688

(51) Int. Cl.
*G01D 5/244* (2006.01)
(52) U.S. Cl.
CPC .................................. *G01D 5/2448* (2013.01)
(58) Field of Classification Search
None
See application file for complete search history.

(56) References Cited

U.S. PATENT DOCUMENTS

| 2015/0106043 A1 | 4/2015 | Yamai et al. |
| 2016/0043676 A1 | 2/2016 | Adam et al. |
| 2017/0131379 A1* | 5/2017 | Omata ................ H02P 29/0241 |

FOREIGN PATENT DOCUMENTS

JP         2001008488 A      1/2001

OTHER PUBLICATIONS

ISA/EP, International Search Report and Written Opinion, dated May 3, 2019, re PCT International Patent Application No. PCT/EP2018/085846.

* cited by examiner

*Primary Examiner* — Douglas X Rodriguez
(74) *Attorney, Agent, or Firm* — Perry + Currier Inc.

(57) ABSTRACT

Method for determining a measuring offset of a rotor position sensor (2) assigned to a rotor (3) of an electric machine (5) comprising stator windings that are supplied by an inverter (6) converting a voltage at a DC link capacitor (7) into an AC current, wherein a candidate value for the measuring offset is determined, comprising the following steps: —controlling a power unit (9) of the inverter (6) to provide the current based on rotor position information (19) measured by the rotor position sensor (2) to the stator windings such that the DC link capacitor (7) of the inverter (6) is actively discharged, —evaluating a plausibility of the candidate value for the measuring offset based on a voltage of the DC link capacitor (7) detected while the power unit (9) is controlled to actively discharge the DC link capacitor (7), and —providing the candidate value as determined measuring offset, if a result of the evaluation is positive.

15 Claims, 4 Drawing Sheets

Figure 1:
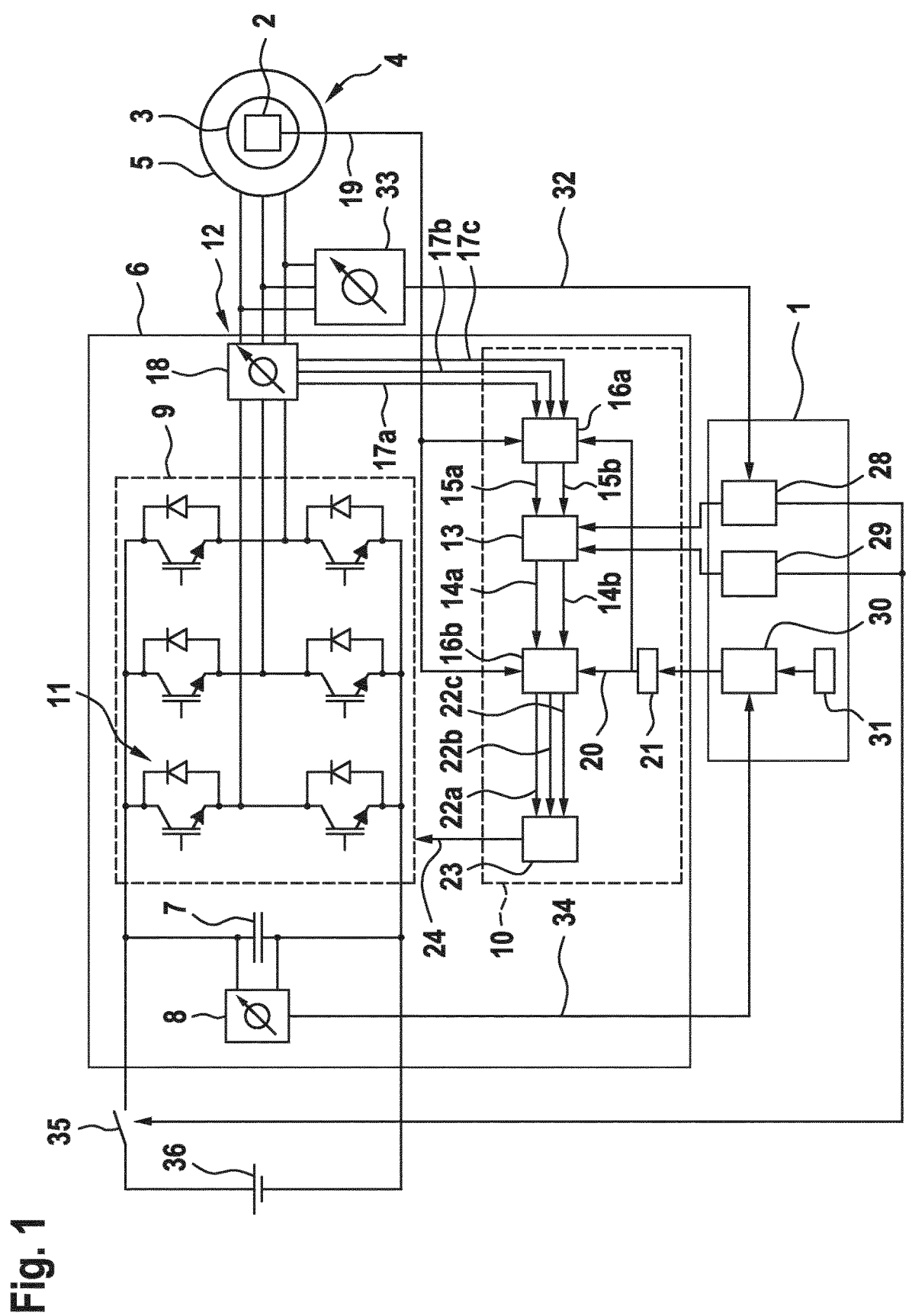

METHOD AND APPARATUS FOR DETERMINING A MEASURING OFFSET OF A ROTOR POSITION SENSOR

The present invention relates to a method for determining a measuring offset of a rotor position sensor assigned to a rotor of an electric machine comprising stator windings that are supplied by an inverter converting a voltage at a DC link capacitor into an AC current, wherein a candidate value for the measuring offset is determined. Besides, the present invention relates to an apparatus for determining a measuring offset of a rotor position sensor.

For a field-oriented control of an electric machine an AC current provided by an inverter is controlled by means of an angle of a magnetic flux depending on a rotor position. In order to detect the rotor position, the use of a rotor position sensor is widely known. Due to mounting inaccuracies, a mounting offset of the rotor position sensor may be present resulting in a measuring offset between a zero-angle of the rotor position sensor and an angle of a d-axis of the electric machine. The measuring offset has to be determined for correcting the control of the inverter in order to achieve maximum torque and maximum utilization of the electric machine. With respect to automotive applications, the measuring offset has to be determined with a certain automotive safety integrity level (ASIL).

Conventionally, it has been proposed to calculate a candidate value for rotor position offset based on target voltages for controlling the electric machine by the inverter. The candidate value is made plausible by means of measuring a DC current flowing into the inverter, when applying a negative d-current to the electric machine. Then, a plausible candidate value may have a certain ASIL. However, the DC current measurement causes high effort and is rather inaccurate.

Alternatively, the measuring offset is determined by electromagnetic-force-based methods, in which voltages induced into stator windings of the electric machine are measured, when currents flowing into the electric machine are controlled to be zero. To achieve a certain ASIL, e.g. ASIL C, the voltage measurement has to be performed with very effortful safety measures.

Thus, it is an object of the present invention to provide an improved method for determining a rotor position offset with high integrity, particularly causing less effort and being more accurate.

According to the invention, the above object is achieved by a method as initially described, comprising the following steps: controlling a power unit of the inverter to provide the current based on rotor position information measured by the rotor position sensor to the stator windings such that the DC link capacitor of the inverter is actively discharged, evaluating a plausibility of the candidate value for the measuring offset based on a voltage of the DC link capacitor detected while the power unit is controlled to actively discharge the DC link capacitor, and providing the candidate value as determined measuring offset, if a result of the evaluation is positive.

The invention is based on the consideration that a discharging characteristic of the DC link capacitor is representative for the measuring offset, when controlling the inverter to actively discharge the DC link capacitor. When the measuring offset is negative, the electric machine is in a motor operation and the DC link capacitor is discharged faster than in the case of a zero measuring offset. Consequently, the voltage of the DC link capacitor decreases faster. Contrarily, when the actual measuring offset is positive, the electric machine is in a generator operation and the DC link capacitor is discharged slower or even recharged, resulting in that the voltage over the DC link capacitor decreases slower or increases, respectively. Thus, the candidate value, which is particularly determined by means of a conventional method, can be made plausible based on the voltage of the DC link capacitor.

Advantageously, an effortful current measurement of the DC current flowing into the inverter, which typically requires shunts or Hall sensors, is avoided as only voltage measurement is required. Since the voltage measurement at the DC link is more accurate than the current measurement, the inventive method allows a determination of the measuring offset with high integrity, high accuracy and low effort.

Preferably, a resolver is used as rotor position sensor. Typically, the rotor position sensor is assigned to the rotor by attaching it mechanically to the electric machine, particularly to the rotor. The AC current may be a three-phase AC current. Desirably, the electric machine is a permanent magnet synchronous machine.

Preferably, the candidate value is determined based on an electromagnetic force measured at all phases of the inverter while controlling the power unit to provide a zero current to the stator windings or is determined based on target values or switching signals causing the inverter to provide a zero current to the stator windings. Thus, conventional electromagnetic-force-based can be extended easily. Therein, for determining the candidate value an offset angle of a d-axis may be determined based on the measured electromagnetic force on the target values or on the switching signals.

In order to avoid high effort for determining the candidate value, the candidate value may be determined without fulfilling an automotive safety integrity level, particularly without redundant measurements and/or without redundant computations. In other word the candidate value may be determined by means of a single measurement and a single computation means. Thus, the desired ASIL of the measuring offset is achieved by combining the determination of the candidate value having merely a QM integrity level with the evaluation based on the detected voltage of the DC link capacitor.

Typically, the power unit is controlled to actively discharge the DC link capacitor by providing a, particularly negative, d-current to the stator windings. Thereby, it is achieved that the electric machine is in a lossy operation mode, if the candidate value is correct.

Preferably, the plausibility is evaluated by comparing a progress of the detected voltage of the DC link capacitor with reference progresses of a voltage assigned to different offsets values. The reference progresses may be determined in advance of performing the method. Data stored in a memory and representing the reference progresses, such as characteristic curves or look-up-tables, may be used.

Therein, the reference progresses have a starting value describing a value of the voltage of the DC link capacitor, when being charged to a reference voltage. Preferably, one reference progress assigned to a zero or nearby zero offset value describes a decay of the voltage of the DC link capacitor to a second reference voltage within a predefined first time span. Furthermore, one reference progress assigned to a negative offset value may describe a decay of the voltage of the DC link capacitor to the second reference voltage within a predefined second time span being shorter than the first time span. Preferably, one reference progress assigned to a positive offset value, particularly below a positive measuring offset threshold, describes a decay of the voltage of the DC link capacitor to the second reference voltage within a predefined third time span being longer than the first time span. Thus, the evaluation may be performed easily by comparing a time span, in which the voltage of the DC link capacitor falls from the first reference voltage to second reference voltage, with a respective time span.

Alternatively or additionally, one reference progress assigned to a positive offset value, particularly above the positive measuring offset threshold, describes a raise of the voltage of the DC link capacitor. The positive measuring offset threshold can be chosen such that it refers to an offset value, for which the voltage of the DC link capacitor remains constant, when controlling the power unit to actively discharge the DC link capacitor.

In all above-mentioned cases the second reference voltage may be a predefined touch voltage, down to which the DC link capacitor can be discharged. Typically, the touch voltage is chosen between 40 V and 70 V, particularly between 55 V and 65 V.

The evaluation may be assumed to be positive, if an absolute value of a difference between the candidate value and the offset value, to which the reference progress matching with the progress of the detected voltage is assigned, is below a predefined threshold. The threshold may be chosen with respect to an acceptable inaccuracy of the determined measuring offset of preferably 1 degree, more preferably of 0.5 degrees. Alternatively, the evaluation may be assumed to be positive, if an absolute value of a difference between a reference progress estimated based on the candidate value and the progress of the detected voltage is below a predefined threshold. The difference may be a difference between the time span of the estimated reference progress and the time span of the progress of the detected voltage.

For controlling the power unit to actively discharge the DC link capacitor a function of the inverter may be used that is implemented to be performed upon receiving an emergency signal for discharging the DC link capacitor, particularly below the predefined touch voltage. As such an emergency discharging is a common safety feature of automotive inverters, no additional control functions have to be implemented into the inverter to perform the inventive method.

Preferably, the candidate value is stored in the inverter for correcting future rotor position information provided by the rotor position sensor.

Advantageously, the method is performed during an end-of-line-test of the electric machine.

Besides, the present invention refers to an apparatus for determining a measuring offset of a rotor position sensor assigned to a rotor of an electric machine, wherein the apparatus is configured to perform a method according to the invention. The apparatus may be integrated into the inverter.

All statements referring to the inventive method apply analogously to the inventive apparatus, so that the above-mentioned advantages of the inventive method may be achieved as well.

Figure 2:
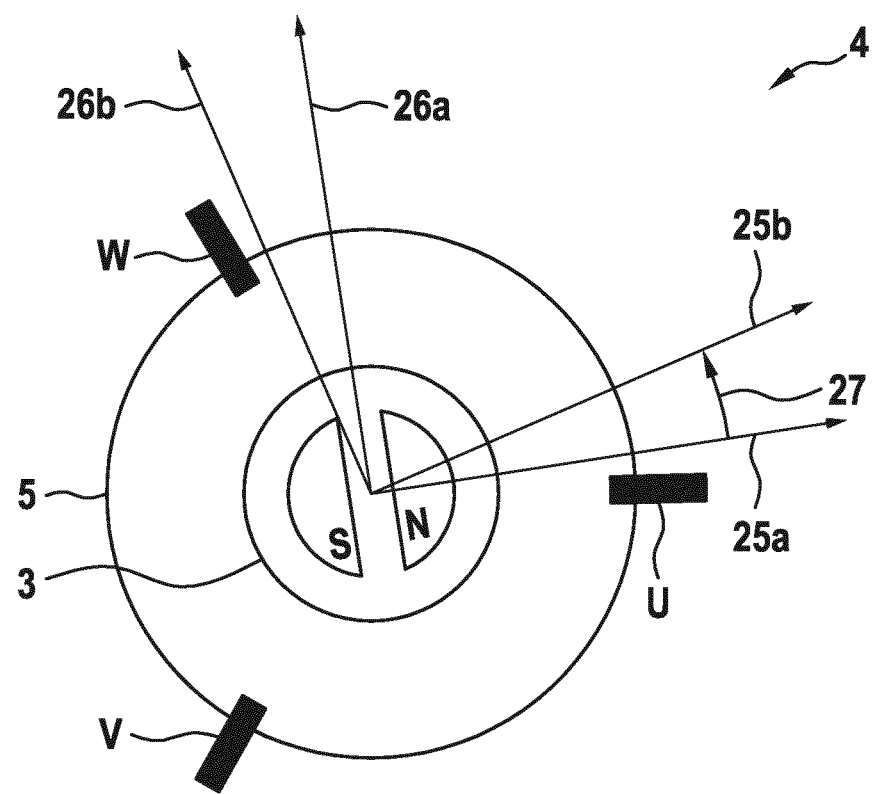
Figure 3:
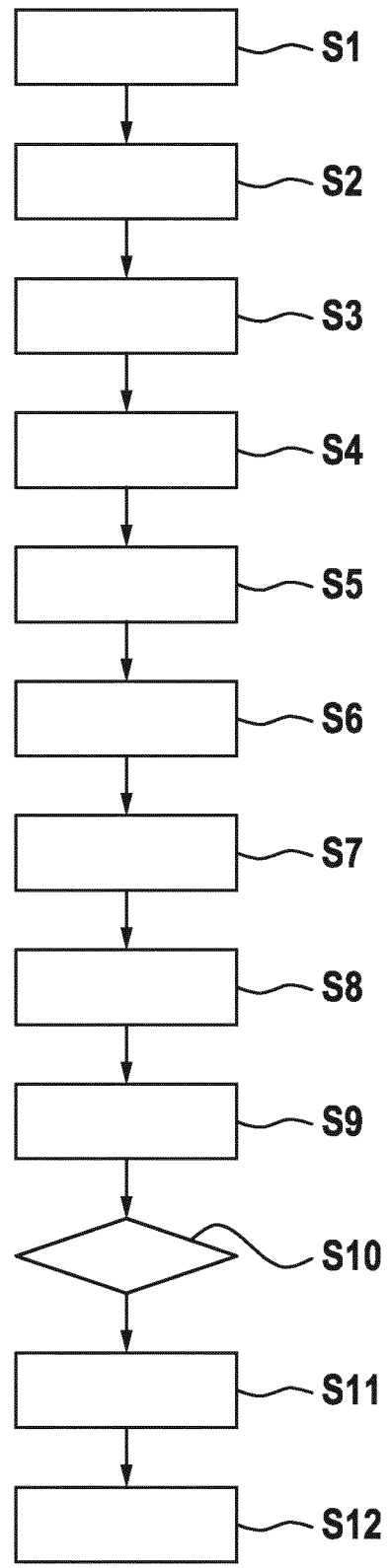
Figure 4:
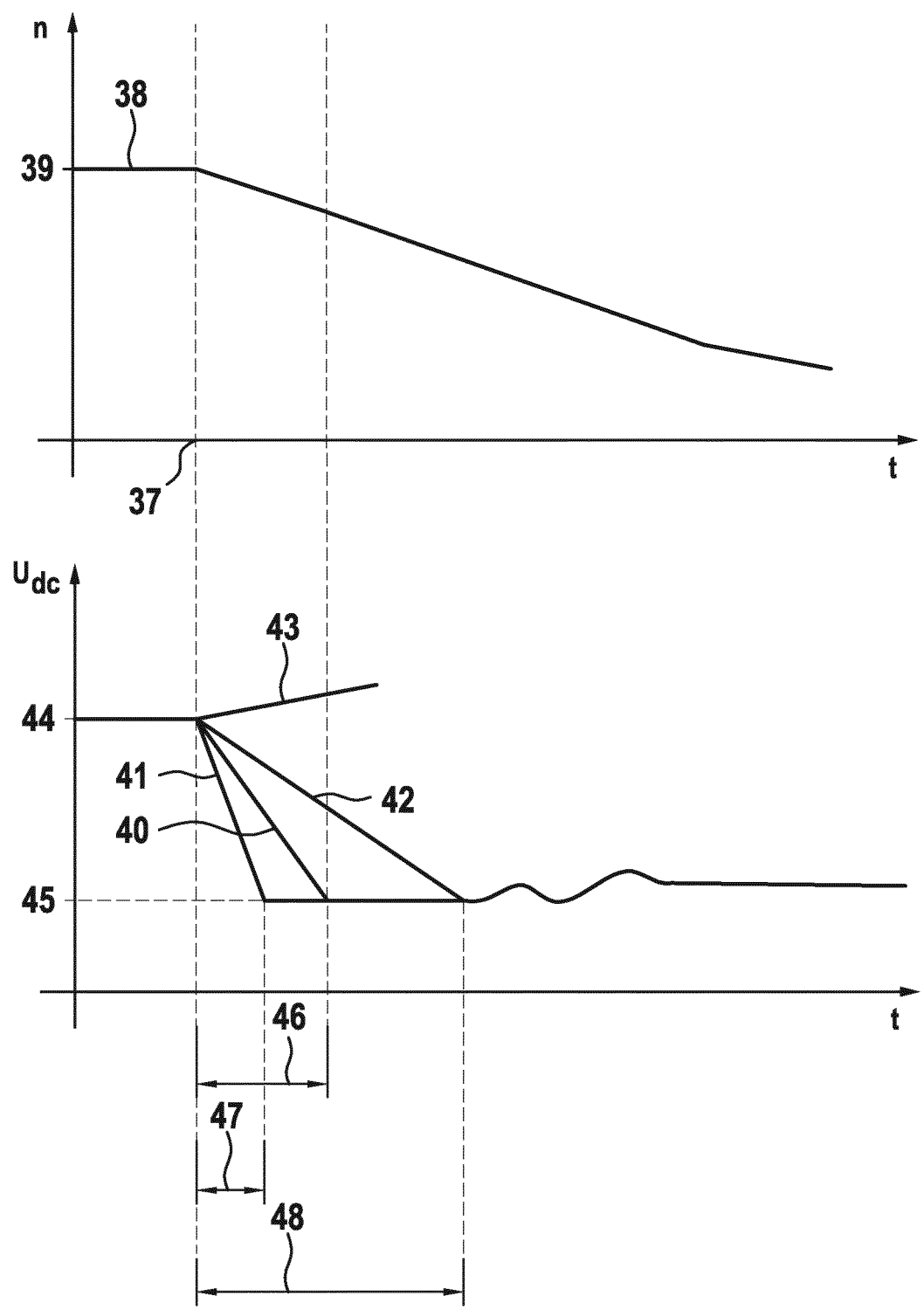

Further details and advantages of the invention are disclosed in the following, wherein reference is made to the drawings showing:

FIG. 1 a block diagram of an embodiment of an apparatus for determining a measuring offset of a rotor position sensor;

FIG. 2 a diagram of an electric machine with a rotor, to which the rotor position sensor is assigned;

FIG. 3 a flow diagram of an embodiment of a method for determining the measuring offset of the rotor position sensor; and FIG. 4 a diagram of reference progresses used in the method.

FIG. 1 is a block diagram of an embodiment of an apparatus 1 for determining a measuring offset of the rotor position sensor 2. The rotor position sensor 2 is a resolver assigned to a rotor 3 of an electric machine 4 having a stator 5. Stator windings of the stator 5 are supplied by an inverter 6. Although depicted as a separate element, the apparatus 1 may be integrated into the inverter 6.

The inverter 6 comprises a DC link capacitor 7, a voltage measurement unit 8, which is configured to detect a voltage at the DC link capacitor 7, a power unit 9 and a control unit 10. The power unit 9 comprises a plurality of semiconductor switching elements 11 arranged in half bridges, which are connected between the potentials of the voltage of a DC link. The control unit 10 is configured to control the power unit 9 to convert the voltage of the DC link capacitor 7 into a three-phase AC voltage provided at an AC output 12 of the inverter 6.

Thereto, the control unit 10 comprises a controlling section 13 configured to provide a target value 14$a$ for a d-voltage and a target value 14$b$ for a q-voltage to be provided to the stator windings. The target values 14$a$, 14$b$ are determined based on actual values 15$a$, 15$b$ of an output current in dq-coordinates, which are provided by a first transformation unit 16$a$ transforming actual current values 17$a$, 17$b$, 17$c$ in uvw-coordinates detected by a current detection unit 18 of the inverter 6 into the dq-coordinates. Therein, the first transformation unit 16$a$ uses a rotor position information 19 provided by the rotor position sensor 2 and a measuring offset information 20 stored in a memory section 21 of the control unit 10 to perform the transformation. The target values 14$a$, 14$b$ are provided to a second transformation section 16$b$ of the control unit 10, which transforms the target values 14$a$, 14$b$ in dq-coordinates into target values 22$a$, 22$b$, 22$c$ in uvw-coordinates by means of the rotor position information 17 and the measuring offset information 18. Based on the target values 22$a$, 22$b$, 22$c$ a modulation section 23 of the control unit 10 provides pulse-width-modulated switching signals 24 to the switching elements 11 of the power unit 9 such that the d-voltage and the q-voltage represented by the target values 14$a$, 14$b$ are provided to the electric machine 4.

FIG. 2 is a detailed diagram of the electric machine 4, which is a permanent magnet synchronous machine. The stator 5 comprises poles U, V, W referring to the aforementioned uvw-coordinates. The rotor 3 has two magnetic poles N, S defining a d-axis 25$a$ and a q-axis 26$a$ of the dq-coordinates.

However, due to mounting inaccuracies of the rotor position sensor 2, the rotor position information 19 provided by the rotor position sensor 2 refers to a d-axis 25$b$ and to a q-axis 26$b$ having the measuring offset represented by an offset angle 27 between the d-axes 25$a$, 25$b$. When the measuring offset is known, it can be stored in the memory section 21 of the control unit 10 in order to correct the rotor position information 19.

The apparatus 1 for determining the measuring offset is used during an end of line test of the electric machine 5 and may be a service device connectable to the inverter 6. The apparatus 1 comprises a determination section 28 a controlling section 29, an evaluation section and a memory section 31. Therein, the determination section 28 is configured to obtain first measurement information 32 provided by a voltage measurement device 33 configured to detect the voltages of the phases supplied by the AC output 12. The evaluation section 30 is configured to obtain second measurement information 34 provided by the voltage measurement unit 8 of the inverter 6. Furthermore, the determination section 28 and the controlling section 29 are each configured to provide control information to the control unit 10, particularly to the controlling section 13, and to control a switch 35, via which the DC link capacitor 7 is supplied by a DC source 36. Alternatively, the switch 35 is controllable by an external controlling device (not shown), e.g. a vehicle control unit.

FIG. 3 is a block diagram of a method for determining the measuring offset of the rotor position sensor 2, wherein the apparatus 1 is configured to perform the method.

In a first step S1 the determination section 28 controls the switch 35 to be closed or checks, whether the switch 35 is closed by the external controlling device. Therein, the DC source 36 provides a DC voltage to the inverter 6. The DC voltage charges the DC link capacitor 7 up to a first reference voltage.

Then, the determination section 28 controls the power unit 9 to rotate the rotor 3 with a predefined rotation rate in a step S2. In a subsequent step S3, when the electric machine 3 has reached a stationary state, the determination section 28 controls the power unit 9 to provide a zero current to the stator windings. Thereto, the determination section 28 provides control information to the control unit 10, in particular to the controlling section 13.

While controlling the inverter to provide the zero current, in a step S4 the determination section 28 obtains the first measurement information 32 representing an electromagnetic force at the phases of the inverter 6 from the voltage measurement device 33. Therein, the voltage measurement device 33 measures the electromagnetic force by a single measurement, thus without any redundant measurements. Therefore, the first measurement information 32 has only a QM integrity level according to ISO 26262 and IEC 61508.

Next, in a step S5 the determination section 28 determines a candidate value for the measuring offset based on the offset angle 27 of the d-axis 25a, which is determined by means of the electromagnetic force. Again, the determination is performed by a single computation, thus without any redundant computation, so that the candidate value is provided with a QM integrity level as well.

In a following steps S6 the controlling section 29 controls the switch 35 to be opened or checks whether the switch 35 has been opened by the external controlling device. Therein, the DC source 36 is disconnected from the DC link capacitor 7.

While the switch 35 is opened, in a step S7 the controlling section 29 controls the power unit 9 of the inverter 6 to provide the current based on the rotor position information 19 measured by the rotor position sensor 2 to the stator windings such that the DC link capacitor 7 is actively discharged. Thereto, the controlling section 29 triggers a function of the inverter that is implemented to be performed upon receiving an emergency signal for discharging the DC link capacitor 7 below a predefined touch voltage of 60 V.

In detail, the controlling section 29 controls the control unit 10, particularly the controlling section 13, to provide a negative d-current to the stator windings. Thus, the rotor position information 19, which is assumed to have a measuring offset not being adequately corrected by the measuring offset information 20, results in that the actual values 17a, 17b, 17c in uvw-coordinates are not properly transformed by the first transformation section 16a into the actual values 15a, 15b in dq-coordinates. Consequently, the switching signals 24 provided by the modulation section 23 are erroneous.

Thereafter, in a step S8 the evaluation section 30 obtains the second measurement information 34 representing a progress of the voltage of the DC link capacitor 7 from the voltage measurement unit 8.

In a step S9 the evaluation section 30 compares the progress with a plurality of reference progresses being stored in the memory section 31 and being represented by a characteristic curve or a lookup table.

The comparison in step S9 is described in the following with reference to FIG. 4 showing a diagram of a rotation rate n and a diagram of a voltage $U_{dc}$ over time t. Before a time 37 a progress 38 of the rotation rate n is constant on a level 39. Reference progresses 40 to 43 corresponding to the voltage of the DC link capacitor 7 are constant on a first reference voltage 44 being a starting value of each reference progress 40 to 43. At the time 37, the power unit 6 is controlled to actively discharge the DC link capacitor 7 in step S7.

The reference progress 40 is assigned to a zero offset value. After the time 37, the reference progress 40 describes a decay of the voltage $U_{dc}$ to a second reference voltage 45 within a first time span 46.

The reference progress of 41 is assigned to a negative offset value of e.g. −3 degrees resulting in that the electric machine 5 is operated as a motor. After the time 37 the reference progress 41 describes a decay of the voltage $U_{dc}$ to the second reference voltage 45 within a second time span 47 being shorter than the first time span 46.

The reference progress 42 is assigned to a positive offset value of e.g. 1.5 degrees resulting in that the electric machine 5 is still operated as a motor but in braking operation range, in which power is recovered to the DC link capacitor 7. After the time 37 the reference progress 42 describes a decay of the voltage $U_{dc}$ to the second reference voltage 45 within a third time span 48 being longer than the first time span 46.

The reference progress 43 is assigned to a positive measuring offset of e.g. 3 degrees resulting in that the electric machine 5 is operated as a generator, thus charging the DC link capacitor 7. After the time 37 the reference progress 43 describes a raise of the voltage $U_{dc}$.

Thus, in the step S9 a time span, in which the voltage of the DC link capacitor 7 described by the second measurement information 34 falls from the first reference voltage 44 to the second reference voltage 45, is determined and compared to the reference progresses 40 to 43. Then, an offset value, to which the reference progress 40 to 43 matching best with the voltage of the DC link capacitor 7 is assigned, is chosen by the evaluation section 30.

In a step S10 the absolute value of a difference between the candidate value and in the chosen offset value is compared to a predefined threshold. If the difference is above the threshold, the candidate value is assumed not to be plausible and discarded. The method jumps to step S1 and repeats the aforementioned steps S1 to S10 in order to detect a better candidate value. If the difference is below the threshold, the candidate value is assumed to be plausible and the evaluation is positive. The method proceeds with a step S11, in which the candidate value is provided as determined measuring offset. Therein, the candidate value having been made plausible has an ASIL, e.g. ASIL C, instead of the QM integrity level, since it based on independent measurement techniques.

In a subsequent step S12 the evaluation section 30 transmits the provided measuring offset to the memory section 21 of the control unit 10, where it is stored for adjusting future rotor position information 19 provided by the rotor position sensor 2.

According to a further embodiment, the candidate value is determined based on the target values 14a, 14b or the switching signals 24 instead of being determined based on a measurement by the voltage measurement device 33. Thus, the voltage measurement device 33 may be omitted.

According to a further embodiment, in the step S9 a reference progress 40 to 43 is estimated based on the candidate value. Therein, the time span, in which the voltage of the DC link capacitor 7 described by the second measurement information 34 falls from the first reference voltage 44 to the second reference voltage 45, is compared to the time span 46 to 48 of the estimated reference progress 40 to 42. In step S10, the evaluation is assumed to be positive, if the absolute value of the difference between the time span of the detected voltage and the time span 46 to 48 of the estimated reference progress 40 to 42 is below a predefined threshold.

The invention claimed is:

1. A method for determining a measuring offset of a rotor position sensor assigned to a rotor of an electric machine comprising stator windings that are supplied by an inverter converting a voltage at a DC link capacitor into an AC current, wherein a candidate value for the measuring offset is determined,
characterized by the following steps:
controlling a power unit of the inverter to provide the current based on rotor position information measured by the rotor position sensor to the stator windings such that the DC link capacitor of the inverter is actively discharged,
evaluating a plausibility of the candidate value for the measuring offset based on a voltage of the DC link capacitor detected while the power unit is controlled to actively discharge the DC link capacitor, and
providing the candidate value as determined measuring offset, if a result of the evaluation is positive.

2. The method according to claim 1, wherein the candidate value is determined based on an electromagnetic force measured at one or more phases of the inverter while controlling the power unit to provide a zero current to the stator windings or is determined based on target values (22a, 22b, 22c) or based on switching signals causing the inverter to provide a zero current to the stator windings.

3. The method according to claim 2, wherein for determining the candidate value an offset angle of a d-axis is determined based on the measured electromagnetic force, on the target values or on the switching signals.

4. The method according to claim 1, wherein the candidate value is determined without fulfilling an automotive safety integrity level, particularly without redundant measurements and/or without redundant computations.

5. The method according to claim 1, wherein the power unit is controlled to actively discharge the DC link capacitor by providing a, particularly negative, d-current to the stator windings.

6. The method according to claim 1, wherein the plausibility is evaluated by comparing a progress of the detected voltage of the DC link capacitor with reference progresses of a voltage assigned to different offsets values.

7. The method according to claim 6, wherein the reference progresses have a starting value describing a value of the voltage (Udc) of the DC link capacitor, when being charged to a reference voltage.

8. The method according to claim 6, wherein one reference progress assigned to a zero or nearby zero offset value describes a decay of the voltage (Udc) of the DC link capacitor to a second reference voltage within a predefined first time span.

9. The method according to claim 8, wherein one reference progress assigned to a negative offset value describes a decay of the voltage (Udc) of the DC link capacitor to the second reference voltage within a predefined second time span being shorter than the first time span.

10. The method according to claim 8, wherein one reference progress assigned to a positive offset value, particularly below a positive measuring offset threshold, describes a decay of the voltage (Udc) of the DC link capacitor to the second reference voltage within a predefined third time span being longer than the first time span and/or one reference progress assigned to a positive offset value, particularly above the positive measuring offset threshold, describes a raise of the voltage (Udc) of the DC link capacitor.

11. The method according to claim 6, wherein the evaluation is assumed to be positive, if an absolute value of a difference between the candidate value and the offset value, to which the reference progress matching with the progress of the detected voltage is assigned, is below a predefined threshold, or if an absolute value of a difference between an reference progress estimated based on the candidate value and the progress of the detected voltage is below a predefined threshold.

12. The method according to claim 1, wherein for controlling the power unit to actively discharge the DC link capacitor a function of the inverter is used that is implemented to be performed upon receiving an emergency signal for discharging the DC link capacitor, particularly below a predefined touch voltage.

13. The method according to claim 1, wherein the candidate value is stored in the inverter for correcting future rotor position information provided by the rotor position sensor.

14. The method according to claim 1, wherein it is performed during an end-of-line-test of the electric machine.

15. An apparatus for determining a measuring offset of a rotor position sensor assigned to a rotor of an electric machine, wherein the apparatus is configured to perform a method according to claim 1.

* * * * *